(12) United States Patent
Kanemitsu et al.

(10) Patent No.: US 6,393,564 B1
(45) Date of Patent: May 21, 2002

(54) DECRYPTING DEVICE

(75) Inventors: Tomohiko Kanemitsu, Toyonaka; Naoya Tokunaga, Moriguchi; Kenta Sokawa, Hirakata; Hiroshi Miyaguchi, Tokyo, all of (JP)

(73) Assignees: Matsushita Electric Industrial Co., Ltd., Osaka (JP); Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/163,257

(22) Filed: Sep. 29, 1998

(30) Foreign Application Priority Data

Sep. 30, 1997 (JP) .............................. 9-267515

(51) Int. Cl.[7] ................................. G06F 1/24
(52) U.S. Cl. ................. 713/168; 713/190; 713/193; 713/200; 713/201; 380/277; 380/281
(58) Field of Search .................. 380/277, 44, 281, 380/47, 28; 713/168, 190, 193, 200, 201

(56) References Cited

U.S. PATENT DOCUMENTS 4,951,247 A    8/1990   Kruse et al.
5,077,793 A  * 12/1991  Falk et al. ..................... 380/28
5,592,556 A  *  1/1997  Schwed ........................ 380/49
5,915,214 A  *  6/1999  Reece et al. ................ 455/406
6,049,611 A  *  4/2000  Tatebayashi et al. .......... 380/44

FOREIGN PATENT DOCUMENTS

EP    0 561 685    9/1993
EP    0 636 962    2/1995

OTHER PUBLICATIONS

European Search Report dated Aug. 2, 2000 for EP 98 11 8396.

* cited by examiner

Primary Examiner—Thomas R. Peeso
(74) Attorney, Agent, or Firm—Ratner & Prestia

(57) ABSTRACT

The decrypting device of this invention includes:
a decrypting key generation circuit for generating a decrypting key based on first decrypting key information and second decrypting key information; and a decrypting circuit for decrypting encrypted information using the decrypting key, wherein the first decrypting key information is input from outside the decrypting device, and the second decrypting key information is stored inside the decrypting device.

20 Claims, 8 Drawing Sheets

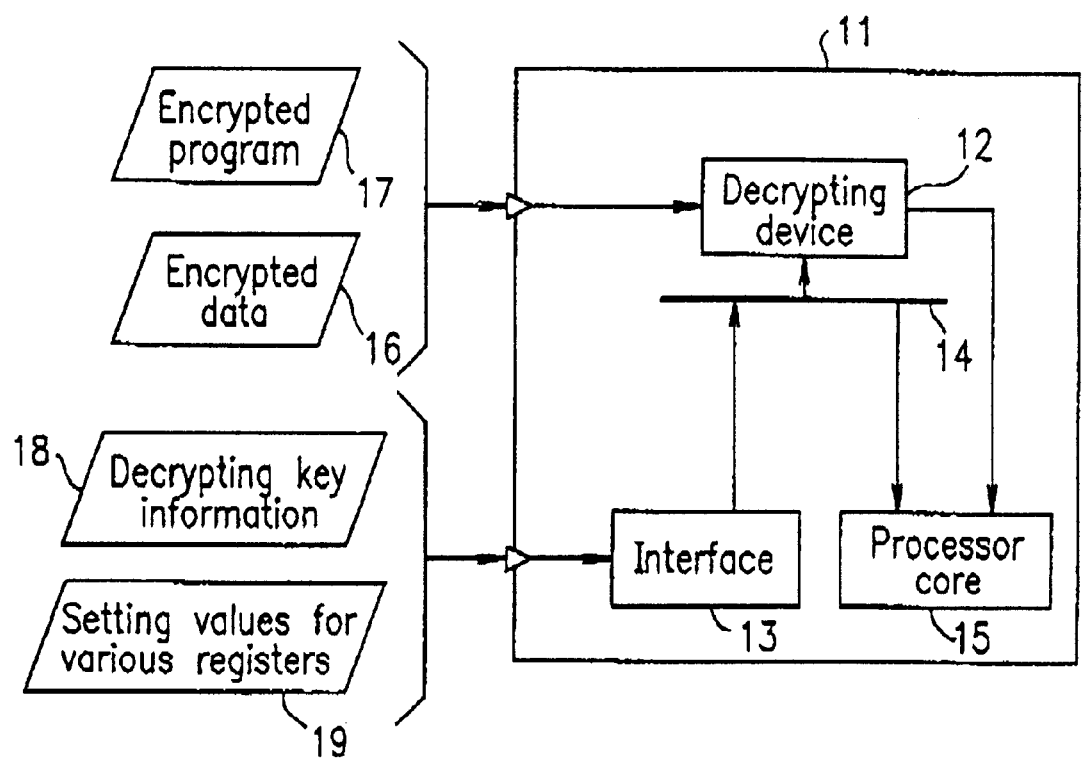

DECRYPTING DEVICE

BACKGROUND OF THE INVENTION

1. Field of the Invention

The present invention relates to a decrypting device for decrypting an encrypted program or encrypted data using a decrypting key.

2. Description of the Related Art

Conventionally, techniques for encrypting data using a key, encrypting the key used in encrypting the data using a master key, and storing the encrypted data and the encrypted key have been proposed one of such techniques is described in S. Tsujii and M. Kasahara, "Cryptography and Information Security", Shokodo, 1990, pp. 208–212.

The above literature discloses a decrypting device for decrypting data encrypted in a manner described above. The decrypting device receives encrypted data and a master key $K_M$. The decrypting device extracts an encrypted key $K_E$ included in a header portion of the encrypted data and stores the encrypted key $K_E$ in a register. The decrypting device then generates a work key $K_W$ based on the encrypted key $K_E$ and the master key $K_M$, to decrypt the encrypted data using the work key $K_W$.

When such a decrypting device is provided inside a processor, only the encrypted date, the encrypted key $K_Z$, and the master key $K_M$ are accessible external to the decrypting device. Accordingly, the encrypted date can be protected from being decrypted externally by confidentially managing the master key $K_M$.

However, the above prior art technique has the following problem. The master key $K_M$ and the work key $K_W$ have a certain correlation with each other based on an encrypting algorithm used to produce the work key $K_W$. Once the master key $K_M$ is revealed, therefore, it is comparatively easy to determine the work key $X_W$ and decrypt the encrypted data if the relevant encrypting algorithm is known.

In order to minimize the above problem, it is known to maintain the confidentiality of the master key $K_M$ at a high level so that only intended recipients right fully decrypting the encrypted data have access. Unfortunately, this has lead to the need for increasing the size of a circuit required to transfer the master key $K_M$ to the decrypting device.

SUMMARY OF THE INVENTION

The decrypting device of this invention includes: a decrypting key generation circuit for generating a decrypting key based on first decrypting key information and second decrypting key information; and a decrypting circuit for decrypting encrypted information using the decrypting key, wherein the first decrypting key information is input from outside the decrypting device, and the second decrypting key information is stored inside the decrypting device.

In one embodiment of the invention, the encrypted information is an encrypted program.

In another embodiment of the invention, the encrypted information is encrypted data.

In still another embodiment of the invention, the decrypting key generation circuit includes; a mixing circuit for generating decrypting key information by mixing the first decrypting key information and the second decrypting key information; and a conversion circuit for converting the decrypting key information into the decrypting key.

In still another embodiment of the invention, the first decrypting key information includes information relating to the decrypting key and dummy data which does not relate to the decrypting key.

In still another embodiment of the invention, the second decrypting key information includes a plurality of decrypting keys, and the decrypting key generation circuit includes a selection circuit for selecting one of the plurality of decrypting keys based at least in part on the first decrypting key information.

In still another embodiment of the invention, the second decrypting key information includes a plurality of decrypting key information units, and the decrypting key generation circuit includes: a selection circuit for selecting one of the plurality of decrypting key information units based at least in part on the first decrypting key information; and a conversion circuit for converting the decrypting key information unit selected by the selection circuit into the decrypting key.

Alternatively, the decrypting device of this invention includes: a decrypting key retrieval circuit for retrieving a decrypting key from decrypting key information; and a decrypting circuit for decrypting encrypted information using the decrypting key, wherein the decrypting key information includes information relating to the decrypting key and dummy data which does not relate to the decrypting key.

In one embodiment of the invention, the encrypted information is an encrypted program.

In another embodiment of the invention, the encrypted information is encrypted data.

In still another embodiment of the invention, the information relating to the decrypting key includes the decrypting key, and the first conversion circuit includes an extraction circuit for extracting the decrypting key from the decrypting key information.

In still another embodiment of the invention, the decrypting key retrieval circuit includes: an extraction circuit for extracting the information relating to the decrypting key from the decrypting key information; and a conversion circuit for converting the information relating to the decrypting key into the decrypting key.

In still another embodiment of the invention, the encrypted information is stored in a memory associated with the decrypting device.

In still another embodiment of the invention, the encrypted information is stored in a memory associated with the decrypting device.

In still another embodiment of the invention, the decrypting device further includes an address shuffling circuit for converting an input address in accordance with a predetermined rule and supplying a converted address to the memory, wherein the encrypted information read from the memory in accordance with the converted address is supplied to the decrypting circuit.

In still another embodiment of the invention, the decrypting device further includes an address shuffling circuit for converting an input address in accordance with a predetermined rule and supplying a converted address to the memory, wherein the encrypted information read from the memory in accordance with the converted address is supplied to the decrypting circuit.

Thus, the invention described herein makes possible the advantages of (1) providing a decrypting device where an encrypted program or encrypted data is prevented from being decrypted easily by a third party which illegally obtains decrypting key information, and (2) providing a decrypting device which allows for the size of a circuit required to transfer decrypting key information to the decrypting device to be reduced.

These and other advantages of the present invention will become apparent to those skilled in the art upon reading and understanding the following detailed description with reference to the accompanying figures.

BRIEF DESCRIPTION OF THE DRAWINGS

FIG. 1 is a block diagram of a processor chip including a decrypting device according to the present invention.

DESCRIPTION OF THE PREFERRED EMBODIMENTS

Figure 2A:
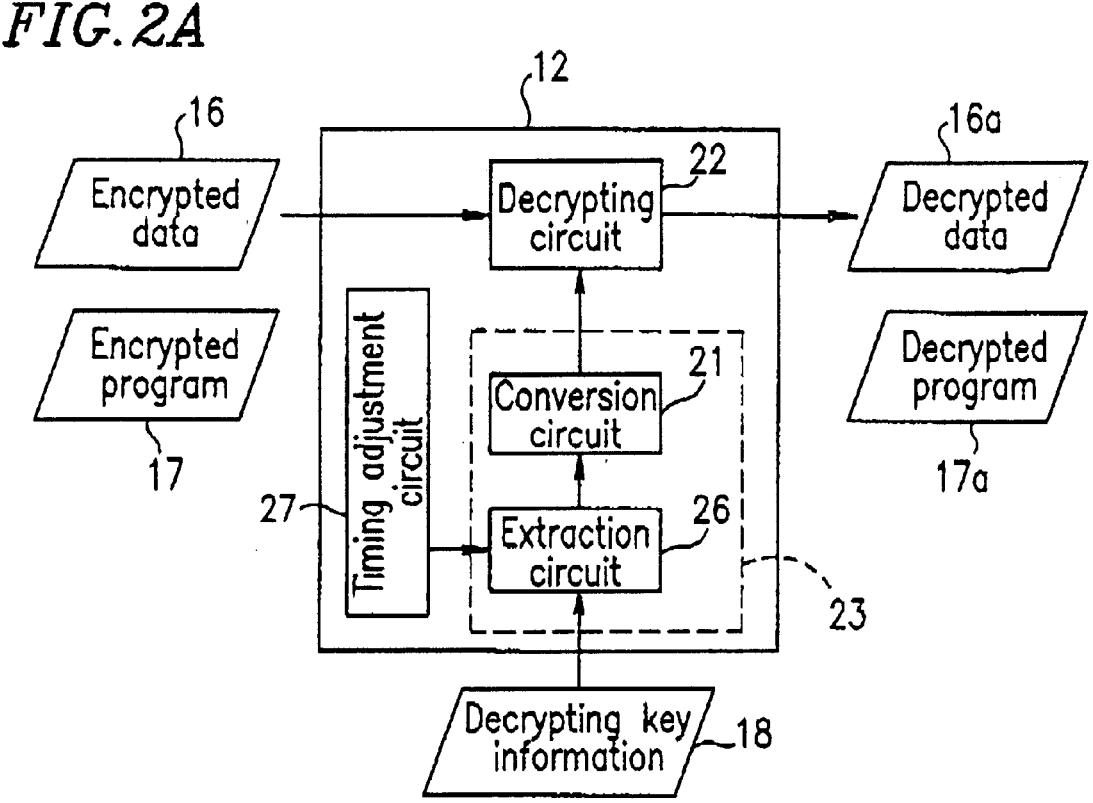
FIG. 2A is a block diagram of a decrypting device of Example 1 according to the present invention.

Hereinbelow, the present invention will be described by way of example with reference to the accompanying drawings.

Example 1

FIG. 1 is a block diagram of a processor chip 11 including a decrypting device 12 according to the present invention. The processor chip 11 also includes an interface 13 and a processor core 15.

Decrypting key information 18 is input into the decrypting device 12 via the interface 13 and a bus 14. The interface 13 is not for the exclusive use of the input of the decrypting key information. For example, the interface 13 may also be used for receiving setting values 19 for various registers (not shown) associated with the processor chip 11.

Encrypted data 16 is input into the decrypting device 12. The decrypting device 12 decrypts the encrypted data 16 using the decrypting key information 18, and supplies decrypted data to the processor core 15. The decrypting key information 18 will be described hereinbelow, together with the details of the decrypting processing, with reference to FIGS. 2A to 2C.

An encrypted program 17 is input into the decrypting device 12. The decrypting device 12 decrypts the encrypted program 17 using the decrypting key information 18, and supplies a decrypted program directly to the processor core 15. Alternatively, the decrypted program may be supplied to a program loader (not shown). When the decrypted program is executed, values are set in a program memory (not shown) and various registers (not shown) disposed in the processor chip 11.

The encrypted data 16 and the encrypted program 17 may be input into the processor chip 11 simultaneously in such a case, two decrypting devices 12 may be arranged in parallel, for example, so that the encrypted data 16 is input into one of the decrypting devices 12 while the encrypted program 17 is input into the other decrypting device 12.

FIG. 2A is a block diagram of the decrypting device 12. The decrypting device 12 includes: a decrypting key retrieval circuit 23 for retrieving a decrypting key from decrypting key information 18; and a decrypting circuit 22 for decrypting the encrypted data 16 or the encrypted program 17 using the decrypting key.

The decrypting key retrieval circuit 23 includes: an extraction circuit 26 for extracting information relating to a decrypting key from the decrypting key information 18; and a conversion circuit 21 for converting the information relating to the decrypting key extracted by the extraction circuit 26 into the decrypting key.

The decrypting key information 18 includes the information relating to the decrypting key and dummy data which does not relate to the decrypting key. The information relating to the decrypting key may be the decrypting key itself or a value having a correlation with the decrypting key.

Figure 2B:
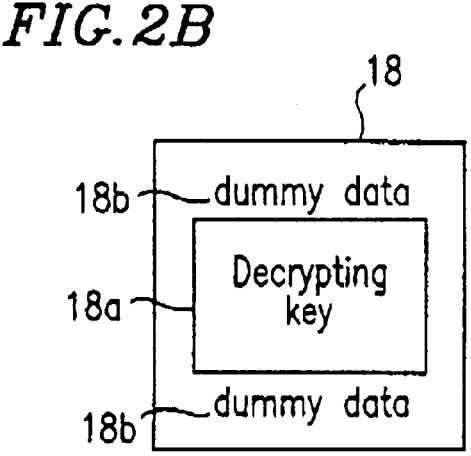
FIGS. 2B and 2C illustrate examples of the configuration of decrypting key information according to the present invention.

FIG. 2B illustrates an exemplary configuration of the decrypting key information 18. The decrypting key information 18 includes a decrypting key 18a and dummy data 18b which does not relate to the decrypting key 18a. The decrypting key 18a is located at a predetermined position in the decrypting key information 18. For example, the position of the decrypting key 18a may be at the fiftieth byte from the beginning of the decrypting key information 18. By filling the portion of the decrypting key information 18 other than the decrypting key 18a with the dummy data 18b, it becomes difficult for a third party to identify the decrypting key 18a from the decrypting key information 18 even if the third party obtains the decrypting key information 18.

Figure 2C:
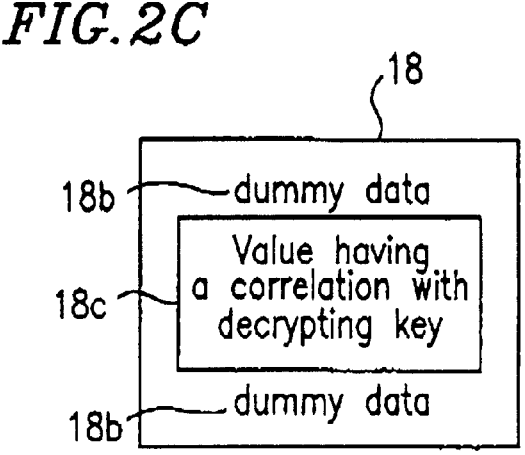

FIG. 2C illustrates another exemplary configuration of the decrypting key information 18. The decrypting key information 18 includes a value 18c having a correlation with the decrypting key 18a (hereinbelow, referred to as a correlation value 18c) and dummy data 18b which does not relate to the decrypting key 18a. The correlation value 18c is located at a predetermined position in the decrypting key information 18. For example, the position of the correlation value 18c may be at the fiftieth byte from the beginning of the decrypting key information 18. By filling the portion of the decrypting key information 18 other than the correlation value 18c with the dummy data 18b, it becomes difficult for a third party to identify the correlation value 18c from the decrypting key information 18 even if the third party obtains the decrypting key information 18.

Thus, by using dummy data which does not relate to the decrypting key 18a, the confidentiality of the decrypting key 18a in the decrypting key information 18 enhances. This makes possible the ability to decrease the level of confidentiality needed for the decrypting key information 18. As a result, the size of a circuit required to transfer the decrypting key information 18 to the decrypting device 12 can be reduced.

Referring back to FIG. 2A, the operation of the decrypting device 12 when the decrypting key information is input will be described.

First, the case where the decrypting key information 18 having the configuration shown in FIG. 2B is input to the decrypting device 12 will be described. More particularly, upon receiving the decrypting key information 18, the extraction circuit 26 extracts the decrypting key 18a from the decrypting key information 18. The timing of the extraction of the decrypting key 18a is controlled with an enable signal output from a timing adjustment circuit 27. The decrypting key 18a extracted by the extraction circuit 26 is supplied to the decrypting circuit 22 by passing through the conversion circuit 21. In this case, i.e., in the case where the decrypting key information 18 has the configuration shown in FIG. 2B, the conversion circuit 21 may be omitted. The decrypting circuit 22 decrypts the encrypted data 16 or the encrypted program 17 using the decrypting key 18a. As a result, decrypted data 16a or a decrypted program 17a is output from the decrypting circuit 22.

Next, the case where the decrypting key information 18 having the configuration shown in FIG. 2C is input to the decrypting device 12 will be described. More particularly, upon receiving the decrypting key information 18, the extraction circuit 26 extracts the correlation value 18c from the decrypting key information 18. The timing of the extraction of the correlation value 18c is controlled with the enable signal output from the timing adjustment circuit 27. The correlation value 18c extracted by the extraction circuit 26 is supplied to the conversion circuit 21, where the correlation value 18c is converted into the decrypting key 18a. The correlation value 18c is a value from which the decrypting key 18a is derived in accordance with a predetermined rule. Therefore, in order to obtain the decrypting key 18a correctly, the predetermined rule is pre-incorporated into the conversion circuit 21. For example, when the correlation value 18c is a value obtained by reversibly converting the decrypting key 18a, an expression for deriving the decrypting key 18a from the correlation value 18c in this manner is pre-incorporated into the conversion circuit 21. The decrypting circuit 22 decrypts the encrypted data 16 or the encrypted program 17 using the decrypting key 18a. As a result, the decrypted data 16a or the decrypted program 17a is output from the decrypting circuit 22.

Figure 3:
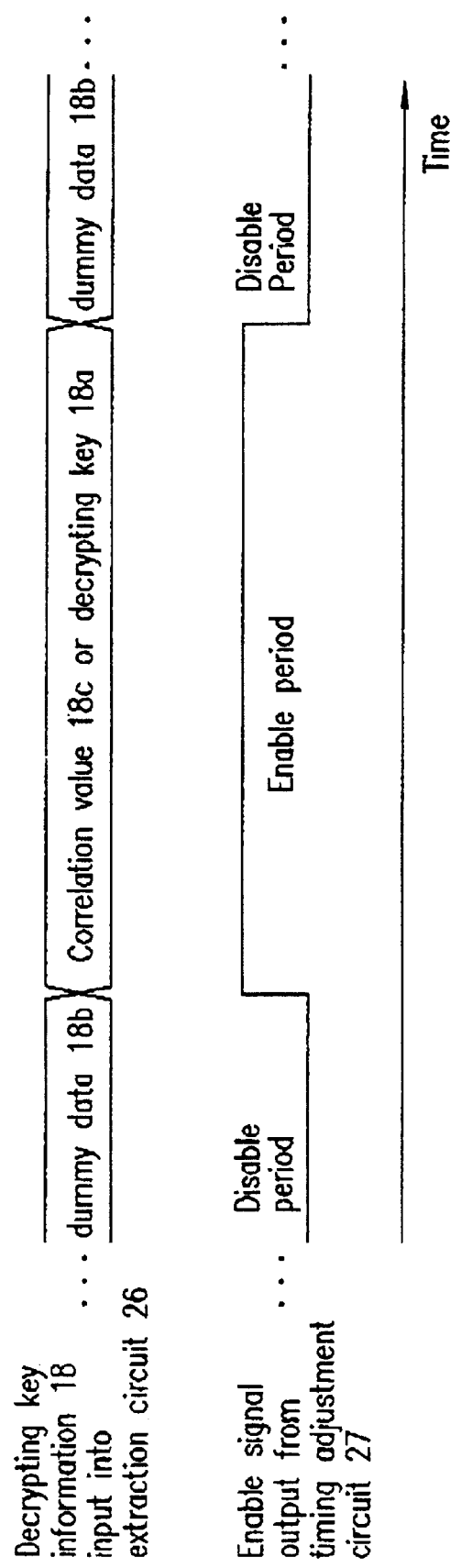
FIG. 3 is a view illustrating the relationship between a timing of the decrypting key information input into an extraction circuit and a timing of an enable signal output from a timing adjustment circuit according to the present invention.

FIG. 3 illustrates the relationship between the timing of the decrypting key information 18 input into the extraction circuit 26 and the timing of the enable signal output from the timing adjustment circuit 27. As is shown in FIG. 3, the decrypting key 18a (or the correlation value 18c) is extracted from the decrypting key information 18 during an enable period when the enable signal is high, and the extracted data is supplied to the conversion circuit 21.

Example 2

Figure 4:
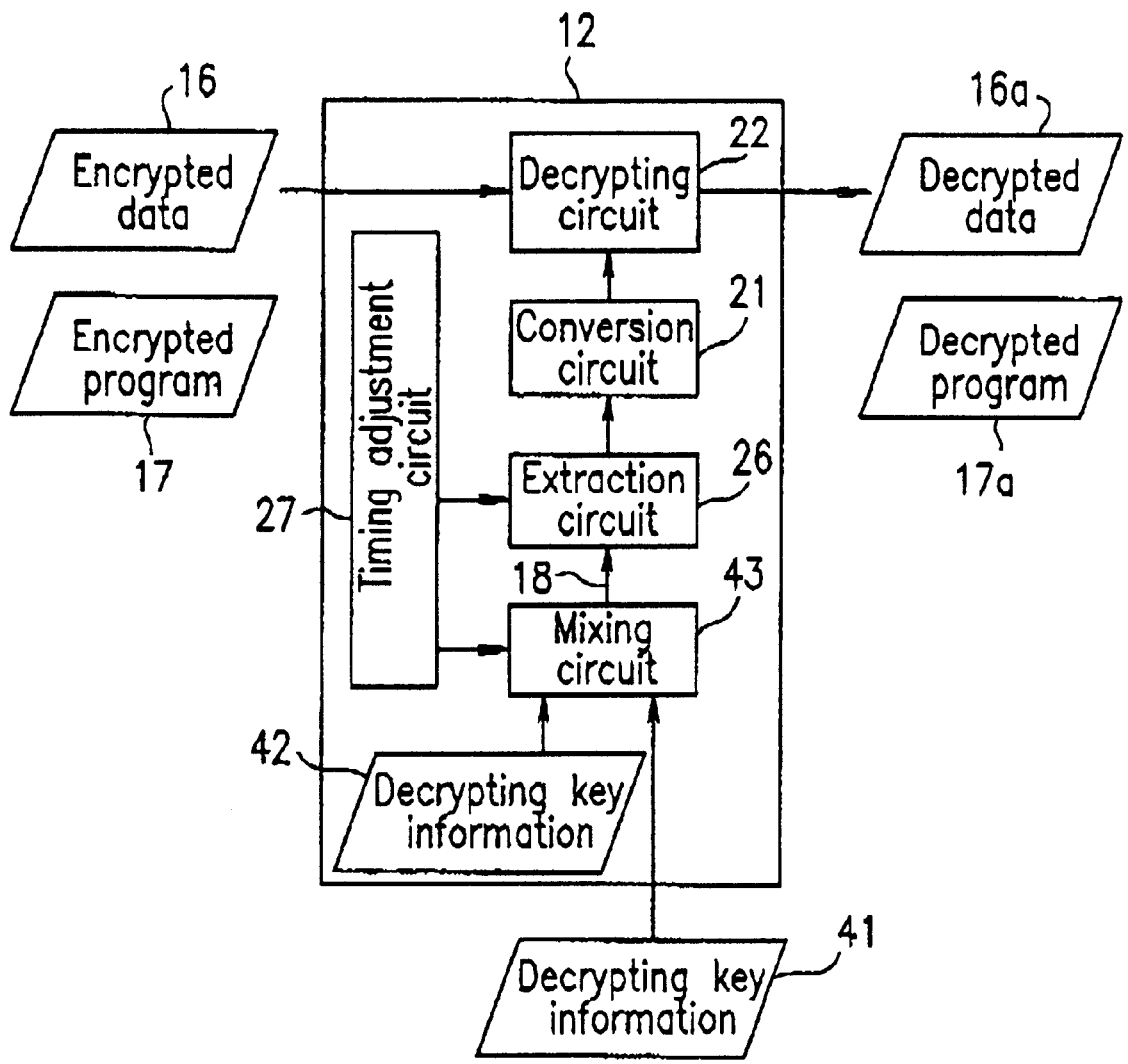
FIG. 4 is a block diagram of a decrypting device of Example 2 according to the present invention.

FIG. 4 is a block diagram of a decrypting device of Example 2 according to the present invention. The relationships between the decrypting device of this example and the peripheral circuits thereof are the same as those shown in FIG. 1.

A decrypting device 12 of this example shown in FIG. 4 includes: a mixing circuit 43 for generating decrypting key information 18 by mixing decrypting key information 41 and decrypting key information 42; an extraction circuit 26 for extracting information relating to a decrypting key from the decrypting key information 18; a conversion circuit 21 for converting the information relating to the decrypting key extracted by the extraction circuit 26 into the decrypting key; and a decrypting circuit 22 for decrypting encrypted data 16 or an encrypted program 17 using the decrypting key.

The decrypting key information 41 is input from outside the decrypting device 12, while the decrypting key information 42 is stored inside the decrypting device 12. The decrypting key information 42 may be stored in a ROM (not shown) associated with the processor chip 11 (see FIG. 1). Alternatively, the decrypting key information 42 may be stored inside the decrypting device 12 by use of a hard-wired logic.

Thus, since a part of the information used for the generation of the decrypting key (i.e., the decrypting key information 42) is stored inside the decrypting device 12, it is difficult for a third party to illegally obtain the decrypting key information 42. If a third party attempts to obtain the decrypting key information 42 illegally, the third party would need to read the circuit inside the decrypting device 12: by use of an electron microscope or the like. Process rules for LSIs have been increasingly miniaturized, and the circuit size tends to increase. Under these circumstances, it is extremely difficult to read the circuit inside the decrypting device 12. Storing the decrypting key information 42 in the ROM is advantageous in that the circuit size of the decrypting device 12 can be made small, compared with the case where the decrypting key information 42 is stored inside the decrypting device 12 by use of a hard-wired logic. However, the former is disadvantageous in that the decrypting key information 42 may be read by a third party by use of an electron microscope or the like. In order to improve the confidentiality of the decrypting key information 42, therefore, the latter, i.e., storing the decrypting key information 42 inside the decrypting device 12 by use of a hard-wired logic is preferable.

Since a part of the information used for the generation of the decrypting key (i.e., the decrypting key information 42) is stored inside the decrypting device 12, it is difficult for a third party to identify the decrypting key even if the third party illegally obtains the decrypting key information 41. This is because the decrypting key is generated based on the decrypting key information 41 and the decrypting key information 42. This allows the level of confidentiality needed for the decrypting key information 41 input from outside the decrypting device 12 to be decreased. As a result, the size of the circuit required to transfer the decrypting key information 41 to the decrypting device 12 can be reduced.

Referring to FIG. 4, the operation of the decrypting device 12 when the decrypting key information 41 is input will be described.

The mixing circuit 43 generates the decrypting key information 16 by mixing the decrypting key information 41 and the decrypting key information 42. The decrypting key information 18 has the configuration shown in FIG. 2B, for example. Alternatively, the decrypting key information 18 may have the configuration shown in FIG. 2C. The operations of the extraction circuit 26, the conversion circuit 21, the decrypting circuit 22, and the timing adjustment circuit 27 are the same as those described above with reference to FIG. 2A.

In order to obtain the decrypting key information 18 correctly, a predetermined rule is pre-incorporated into the mixing circuit 43 which matches the rule by which the decrypting key information 18 has been divided into the decrypting key information 41 and the decrypting key information 42. For example, when the decrypting key information 18 is 100 byte data, the former half of the data of 50 bytes may be input from outside the decrypting device 12 as the decrypting key information 41, while the latter half of the data of 50 bytes may be stored inside the decrypting device 12 as the decrypting key information 42, In this case, the mixing circuit 43 generates the decrypting key information 18 (100 bytes) by coupling the decrypting key information 42 (50 bytes) to the end of the decrypting key information 41 (50 bytes). Any other arbitrary method for dividing the decrypting key information 18 into the decrypting key information 41 and the decrypting key information 42 may be employed.

Figure 5:
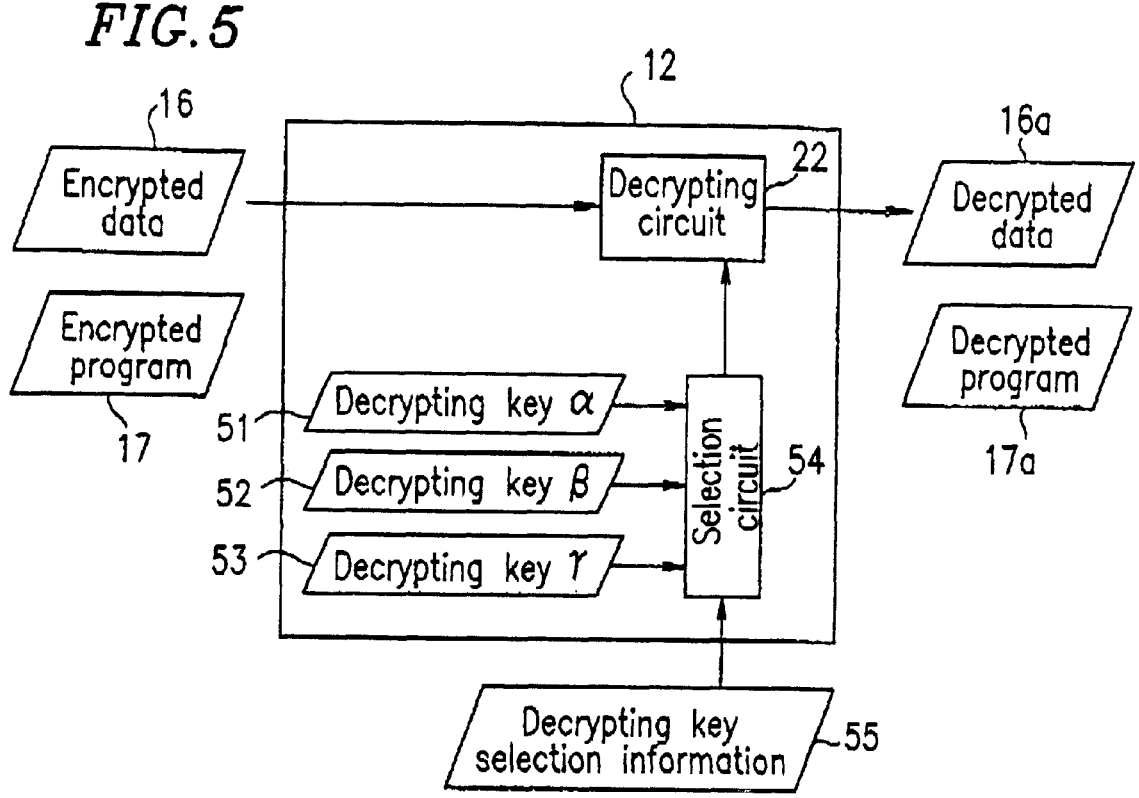
FIG. 5 is a block diagram of another decrypting device of Example 2 according to the present invention.

FIG. 5 illustrates another configuration of the decrypting device 12 of this example according to the present invention. The relationships between the decrypting device 12 and the peripheral circuits thereof are the same as those shown in FIG. 1.

The decrypting device 12 shown in FIG. 5 includes: a selection circuit 54 for selecting one of a decrypting key α, a decrypting key β, and a decrypting key γ based on decrypting key selection information 55;, and the decrypting circuit 22 for decrypting the encrypted data 16 or the encrypted program 17 using the decrypting key selected by the selection circuit 54.

The decrypting key selection information 55 is input from outside the decrypting device 12, while all of the decrypting keys α, β, and γ are stored inside the decrypting device 12. The decrypting keys α, β, and γ may be stored in a manner similar to that described above where the decrypting key information 42 is stored inside the decrypting device 12. When stored in a ROM (not shown) associated with the processor chip 11 (see FIG. 1), for example, the decrypting key α, the decrypting key β, and the decrypting key γ may be located at storing positions 51, 52, and 53 of the ROM, respectively.

Thus, since a part of the information used for the generation of the decrypting key (i.e., the decrypting keys α, β, γ) is stored inside the decrypting device 12, it is difficult for a third party to identify the decrypting key even if the third party obtains the decrypting key selection information 55. This is because the value of the decrypting key selection information 55 may be a value having no direct correlation with the values of the decrypting keys α, β, γ. This allows the level of confidentiality of the decrypting key selection information 55 input from outside the decrypting device 12 to be decreased. As a result, the size of the circuit required to transfer the decrypting key selection information 55 to the decrypting device 12 can be reduced.

Referring to FIG. 5, the operation of the decrypting device 12 when the decrypting key selection information 55 is input will be described.

The selection circuit 54 selects one of the decrypting key α, the decrypting key β, and the decrypting key γ based on the decrypting key selection information 55. For example, the selection circuit 54 selects the decrypting key α when the decrypting key selection information 55 has a value of "1", selects the decrypting key β when it has a value of "1", or selects the decrypting key γ when it has a value of "2". The relationship between the value of the decrypting key selection information 55 and the decrypting key to be selected may be arbitrarily set. The decrypting circuit 22 decrypts the encrypted data 16 or the encrypted program 17 using the decrypting key selected by the selection circuit 54. As a result, the decrypted data 16*a* or the decrypted program 17*a* is output from the decrypting circuit 22.

The number of decrypting keys stored inside the decrypting device 12 is not limited to three, but may be any arbitrary positive integer.

Alternatively, decrypting key information including a decrypting key and dummy data may be stored inside the decrypting device 12, in place of each of the above decrypting keys. In this case, an extraction circuit for extracting the decrypting key from the decrypting key information may be arranged at a stage preceding the decrypting circuit 22. Likewise, the decrypting key selection information 55 may include dummy data. In this case, another extraction circuit for extracting a value corresponding to the decrypting key from the decrypting key selection information 55 may be arranged at a stage preceding the selection circuit 54.

Figure 6:
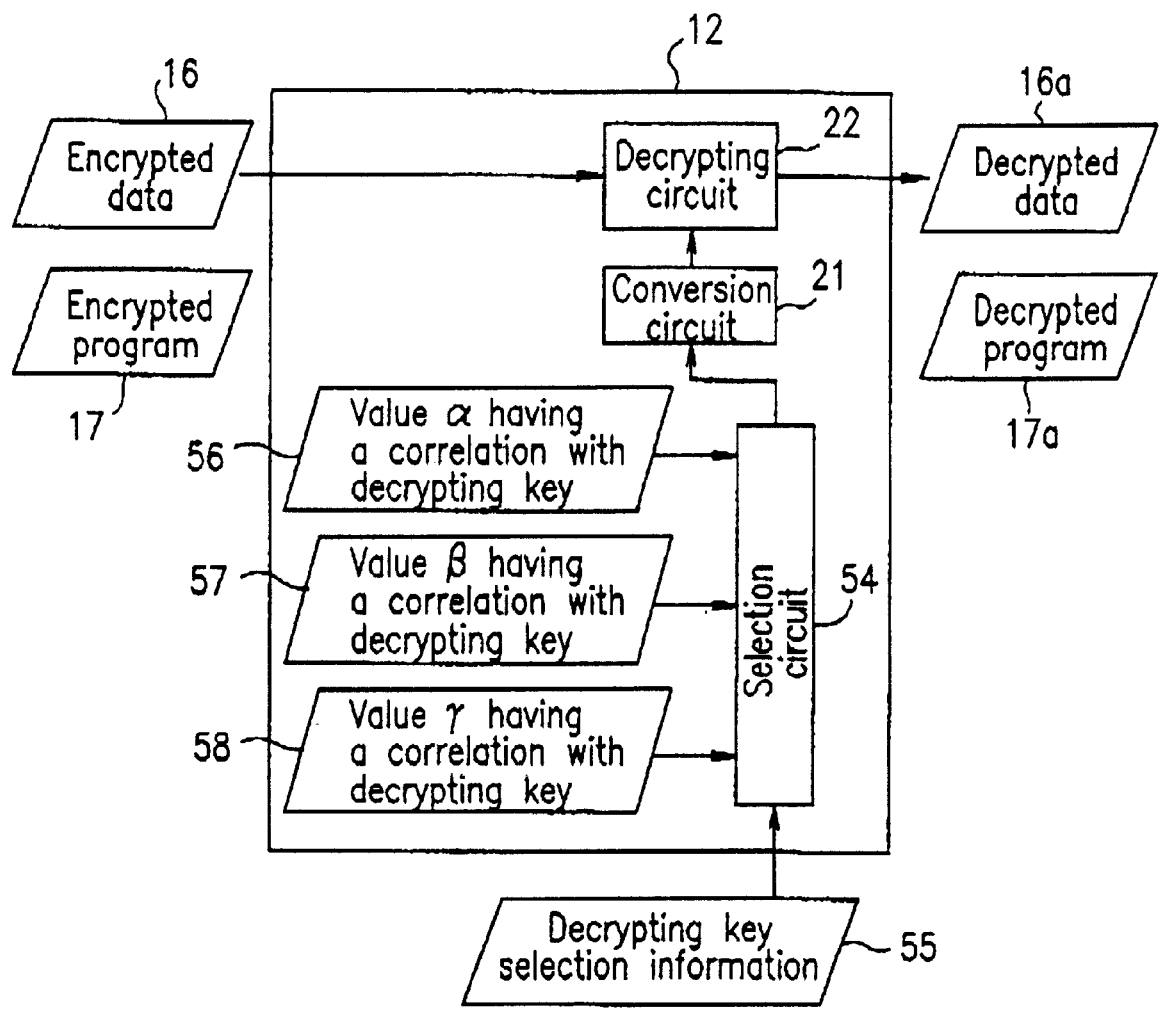
FIG. 6 is a block diagram of still another decrypting device of Example 2 according to the present invention.

FIG. 6 illustrates still another configuration of the decrypting device 12 of this example according to the present invention. The relationships between the decrypting device 12 and the peripheral circuits thereof are the same as those shown in FIG. 1.

The decrypting device 12 shown in FIG. 6 includes: a selection circuit 54 for selecting an information unit such as, for example, one of a value a having a correlation with a decrypting key (hereinbelow, referred to as a correlation value α), a value β having a correlation with a decrypting key (hereinbelow, referred to as a correlation value β), and a value γ having a correlation with a decrypting key (hereinbelow, referred to as a correlation value γ) based on a decrypting key selection information 55; the conversion circuit 21 for converting the correlation value selected by the selection circuit 54 into the decrypting key; and the decrypting circuit 22 for decrypting the encrypted data 16 or the encrypted program 17 using the decrypting key.

The decrypting key selection information 55 is input from outside the decrypting device 12, while all of the correlation values α, β, and γ are stored inside the decrypting device 12. The correlation values α, β, and γ may be stored in a manner similar to that described above where the decrypting key information 42 is stored inside the decrypting device 12. When the correlation values α, β, and γ are stored in a ROM (not shown) associated with the processor chip 11 (see FIG. 1), for example, the correlation values α, β, and γ may be located at storing positions 56, 57, and 58 of the ROM, respectively.

Thus, in the decrypting device 12 shown in FIG. 6, since the correlation values α, β, and γ are stored inside the decrypting device 12, in place of the decrypting keys α, β, γ shown in FIG. 5, it is further difficult for a third party to identify the decrypting key even if the third party obtains the decrypting key selection information 55.

Referring to FIG. 6, the operation of the decrypting device 12 when the decrypting key selection information 55 is input will be described.

The selection circuit 54 selects one of the correlation values α, β, and γ based on the decrypting key selection information 55. For example, the selection circuit 54 selects the correlation value α when the decrypting key selection information 55 has a value of "0", selects the correlation value β when it has a value of "1", or selects the correlation value γ when it has a value of "2", The relationship between the value of the decrypting key selection information 55 and the correlation value to be selected may be arbitrarily set. The conversion circuit 21 converts the correlation value selected by the selection circuit 54 into the decrypting key. The decrypting circuit 22 decrypts the encrypted data 16 or the encrypted program 17 using the decrypting key. As a result, the decrypted data 16*a* or the decrypted program 17*a* is output from the decrypting circuit 22.

The number of correlation values stored inside the decrypting device 12 is not limited to three, but may be any arbitrary positive integer.

Alternatively, decrypting key information including a correlation value and dummy date may be stored inside the decrypting device 12, in place of each of the correlation values. In this case, an extraction circuit for extracting the correlation value from the decrypting key information may be arranged at a stage preceding the conversion circuit 21.

Likewise, the decrypting key selection information 55 may include dummy data. In this case, another extraction circuit for extracting a value corresponding to the correlation value from the decrypting key selection information 55 may be arranged at a stage preceding the selection circuit 54.

Any combination of the configurations of the decrypting device of this example shown in FIGS. 4 to 6 is also included within the scope of the present invention.

Example 3

Figure 7:
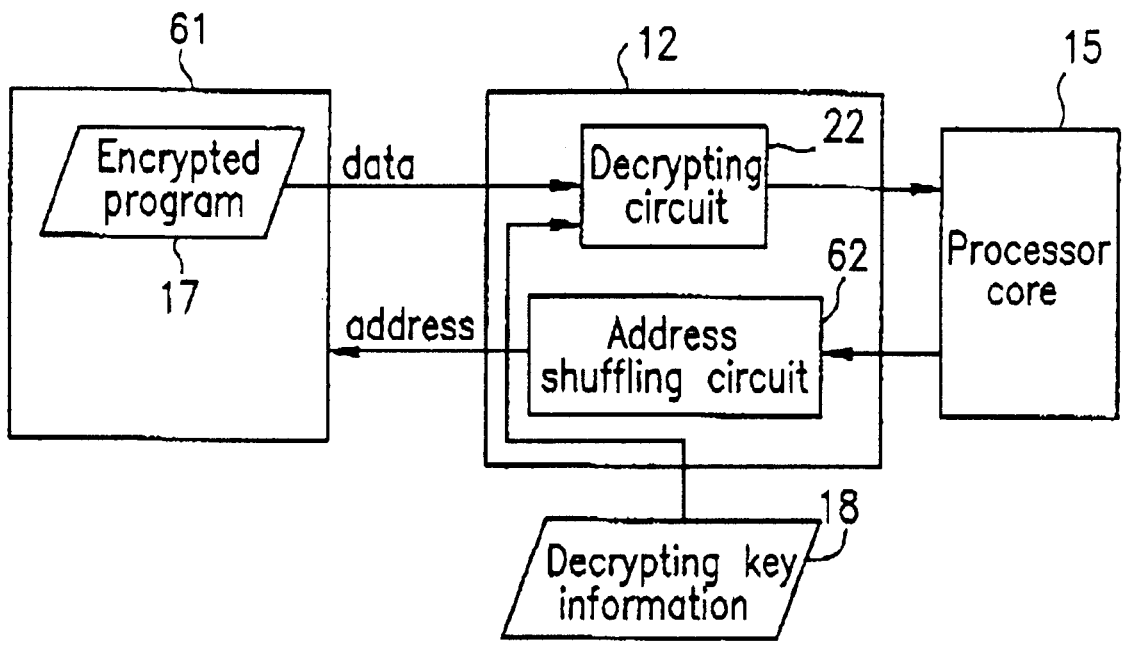
FIG. 7 is a block diagram of a decrypting device of Example 3 according to the present invention.

FIG. 7 is a block diagram of a decrypting device of Example 3 according to the present invention.

Referring to FIG. 7, a decrypting device 12 of this example includes, an address shuffling circuit 62 for providing an address to a program-storing memory 61; and a decrypting circuit 22 for decrypting an instruction of an encrypted program 17 designated by the address.

The program-storing memory 61 may be disposed inside or outside the processor Chip (see FIG. 1), and may be disposed inside or outside the decrypting device 12. The encrypted program 17 is stored in the program-storing memory 61 disposed in relation with the decrypting device 12.

The operation of the decrypting device 12 will be described with reference to FIG. 7.

When no address shuffling is performed, addresses are sequentially output from a processor core 15 (or a program loader not shown) to the program-storing memory 61 directly without passing through the address shuffling circuit 62. Instructions of the encrypted program 17 are sequentially read from the program-storing memory 61 in accordance with the addresses, and supplied to the decrypting circuit 22. The decrypting circuit 22 decrypts the instructions of the encrypted program 17 designated by the addresses based on the decrypting key information 18. Thus, when no address shuffling is performed, the instructions of the encrypted program 17 need to be prerecorded in the program-storing memory 61 sequentially.

When address shuffling is performed, addresses sequentially output from the processor core 15 (or a program loader not shown) are input into the address shuffling circuit 62. The address shuffling circuit 62 converts the input addresses in accordance with a predetermined rule, and outputs the converted addresses to the program-storing memory 61. Instructions of the encrypted program 17 are then read from the program-storing memory 61 in accordance with the converted addresses, and supplied to the decrypting circuit 22, The decrypting circuit 22 decrypts the instructions of the encrypted program 17 designated by the addresses based on the decrypting key information 18. In this case, the instructions of the encrypted program 17 need to be prerecorded in the program-storing memory 61 in consideration of the characteristics of the address conversion performed by the address shuffling circuit 62.

The address conversion by the address shuffling circuit 62 may be performed in a variety of ways. For example, the addresses may be regularly shuffled by converting even addresses into the next highest odd addresses and odd addresses into the next highest even addresses, for example. Alternatively, the addresses may be shuffled randomly.

Although the decrypting circuit 22 is shown to receive the decrypting key information 18 directly in FIG. 7, the decrypting circuit 22 May be configured to receive the decrypting key 18a (see FIG. 2B) extracted from the decrypting key information 18 by use of a configuration as shown in FIG. 2A. Alternatively, the decrypting key information 18 may be divided into the decrypting key information 41 and the decrypting key information 42, and the decrypting circuit 22 may receive the decrypting keys 18a generated from the decrypting key information 41 and the decrypting key information 42 by use of a configuration as shown in FIG. 4. Alternatively, the decrypting circuit 22 may receive a decrypting key selected by use of a configuration as shown in FIG. 5, using decrypting key selection information 55. Alternatively, the decrypting circuit 22 may receive a decrypting key generated by use of a configuration as shown in FIG. 6, using decrypting key selection information 55.

A data-storing memory for storing encrypted data may be disposed to allow the address shuffling circuit 62 to provide addresses to the data-storing memory.

Example 4

In Example 4, a processor chip including the decrypting device according to the present invention is incorporated in an actual application.

Figure 8:
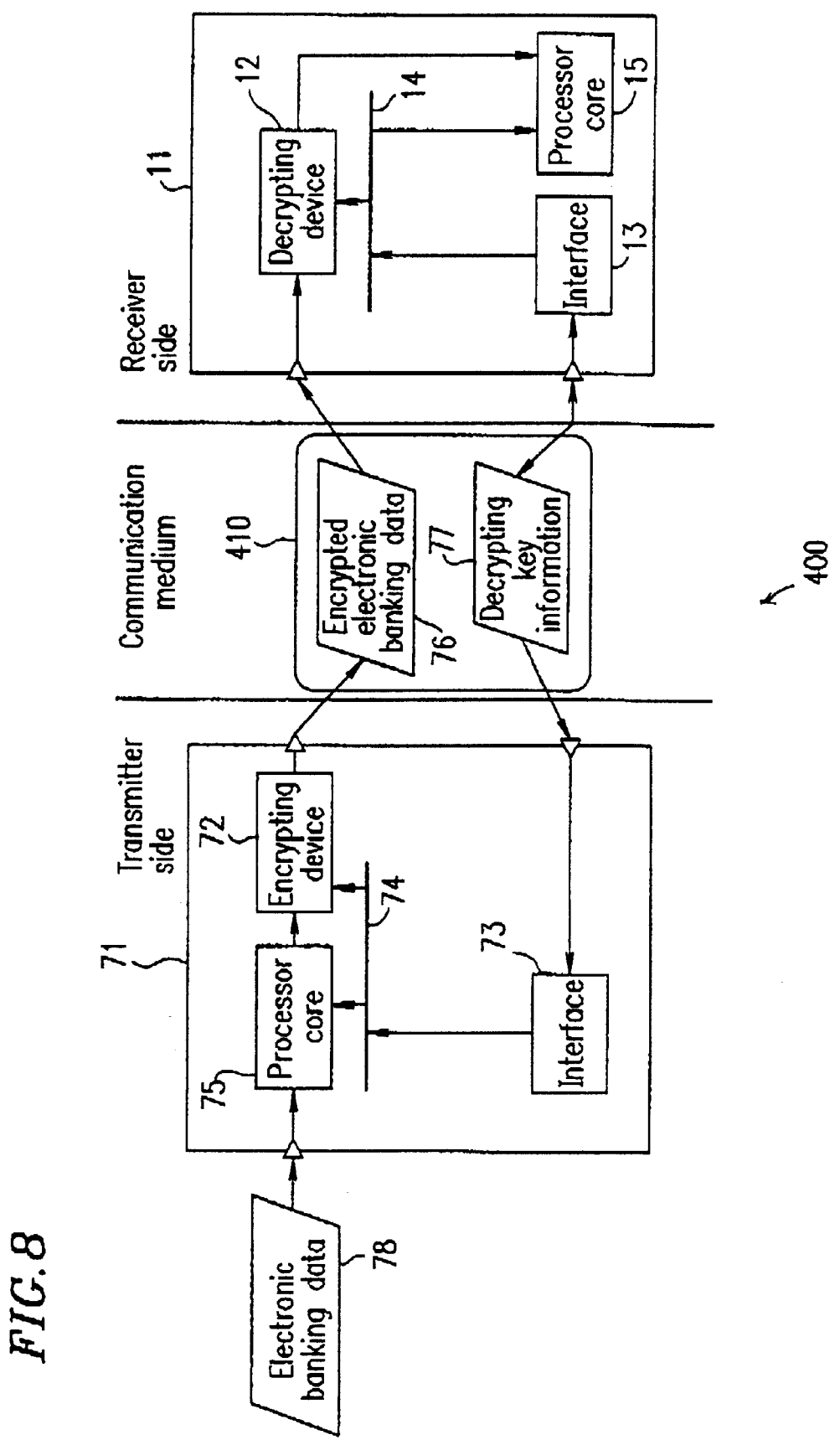
FIG. 8 is a block diagram of an electronic banking system.

FIG. 8 illustrates the configuration of an electronic banking system 400. The electronic banking system 400 includes a transmitter-side processor chip 71 and a receiver-side processor chip 11. The processor chips 71 and 11 are connected with each other via a communication line 410.

The transmitter-side processor chip 71 includes an encrypting device 72, an interface 73, and a processor core 75. The interface 73 Is connected to the encrypting device 72 via a bus 74. The encrypting device 72 includes an encrypting circuit (not shown) for encrypting electronic banking data using an encrypting key.

The receiver-side processor chip 11 includes a decrypting device 12, an interface 13, and a processor core 15. The interface 13 is connected to the decrypting device 12 via a bus 14. The decrypting device 12 includes a decrypting circuit (not shown) for decrypting the encrypted electronic banking data using a decrypting key. The decrypting key used in the decrypting circuit and the encrypting key used in the encrypting circuit are the same. The decrypting device 12 may have one of the configurations shown in Examples 1 and 2.

The operations of the processor chips 71 and 11 when the electronic banking data is transmitted over a computer network will be described.

The processor chip 11 transmits decrypting key information 77 to the processor chip 71 via the communication line 410.

The processor chip 71 receives the decrypting key information 77 via the communication line 410. The decrypting key information 77 is input into the encrypting device 72 via the interface 73. Electronic banking data 78 is input into the processor core 75 of the processor chip 71, processed by the processor core 75 as required, and output from the processor core 75 to the encrypting device 72. The encrypting device 72 encrypts the electronic banking data 78 based on the decrypting key information 77 to obtain encrypted electronic banking data 76. The processor chip 71 transmits the encrypted electronic banking data 76 to the processor chip 11 via the communication line 410, The processor chip 11 receives the encrypted electronic banking data 76 via the communication line 410. The encrypted electronic banking data 76 is input into the decrypting device 12, which decrypts the encrypted electronic banking data 76 based on the decrypting key information 77, thereby to obtain the electronic banking data 78. The electronic banking data 78 is processed by the processor core 15 as required, and output from the processor core 15 outside the processor chip 11.

As described above, the electronic banking data 78 is encrypted before being transmitted via the communication line 410. This improves the confidentiality of the electronic banking data 78. The confidentiality of the electronic banking data 78 is further improved by inserting dummy data in the decrypting key information 77 as described in Example 1. Also, the confidentiality of the electronic banking data 78 is further improved by generating the decrypting key used for decrypting the encrypted electronic banking data 76 based on both the decrypting key information 77 input from outside the decrypting device 12 and decrypting key information stored inside the decrypting device 12 as described in Example 2.

A medium used for the communication between the processor chips 71 and 11 is not limited to the communication line. Such a communication medium may be a magnetic medium such as an IC card, or an optical disk. When a magnetic medium or an optical disk is used as the communication medium, the decrypting key information must to be prerecorded in such a communication medium.

An encrypted program, in place of the encrypted data, may be transmitted between the processor chips 71 and 11 via a communication medium. When the transmitter side (FIG. 8) desires to protect the processing details of the program from being revealed to the receiver side, the processor chips 71 and 11 are preferably constructed so that, while the encrypted program is transmitted between the processor chips 71 and 11, the decrypted program will never be output outside the processor chip 11. An example of such a program is a program for processing images.

Thus, according to an embodiment of the decrypting device of the present invention, information encrypted using a decrypting key is decrypted. The decrypting key is generated based on first decrypting key information and second decrypting key information. The first decrypting key information is input from outside the decrypting device, while the second decrypting key information is stored inside the decrypting device. Since part of information used to generate the decrypting key (i.e., the second decrypting key information) is stored inside the decrypting device, it is difficult for a third party to identify the decrypting key even if the third party obtains the first decrypting key information. This allows for decreasing the level of confidentiality needed for the first decrypting key information input from outside the decrypting device. As a result, the size of the circuit needed to transfer the first decrypting key information to the decrypting device can be reduced.

According to another embodiment of the decrypting device of the present invention, information encrypted using a decrypting key is decrypted. The decrypting key is obtained by converting decrypting key information. The decrypting key information includes information relating to the decrypting key and dummy data which does not relate to the decrypting key. Since the decrypting key information includes the dummy data which does not relate to the decrypting key, it is difficult for a third party to identify the Information relating to the decrypting key included in the decrypting key information even if the third party obtains the decrypting key information. This allows for decreasing the level of confidentiality needed for the decrypting key information. As a result, the size of the circuit required to transfer the decrypting key information to the decrypting device can be reduced.

Various other modifications will be apparent to and can be readily made by those skilled in the art without departing from the s cope and spirit of this invention. Accordingly, it is not intended that the scope of the claims appended hereto be limited to the description as set forth herein, but rather that the claims be broadly construed.

What is claimed is:

1. A decrypting device comprising:
   a decrypting key generation circuit for generating a decrypting key based on first decrypting key information and second decrypting key information; and
   a decrypting circuit for decrypting encrypted information using the decrypting key;
   wherein the first decrypting key information is input from outside the decrypting device, when the encrypted information is received, and the second decrypting key information is stored inside the decrypting device.

2. A decrypting device according to claim 1, wherein the encrypted information is an encrypted program.

3. A decrypting device according to claim 1, wherein the encrypted information is encrypted data.

4. A decrypting device according to claim 1, wherein the decrypting key generation circuit comprises:
   a mixing circuit for generating decrypting key information by mixing the first decrypting key information and the second decrypting key information; and
   a conversion circuit for converting the decrypting key information into the decrypting key.

5. A decrypting device according to claim 1, wherein the first decrypting key information includes information relating to the decrypting key and dummy data which does not relate to the decrypting key.

6. A decrypting device according to claim 1, wherein the second decrypting key information includes a plurality of decrypting keys, and
   the decrypting key generation circuit includes a selection circuit for selecting one of the plurality of decrypting keys based at least in part on the first decrypting key information.

7. A decrypting device according to claim 1, wherein the second decrypting key information includes a plurality of decrypting key information units, and
   the decrypting key generation circuit includes:
      a selection circuit for selecting one of the plurality of decrypting key information units based at least in part on the first decrypting key information;
      a conversion circuit for converting the decrypting key information unit selected by the selection circuit into the decrypting key.

8. A decrypting device according to claim 1, wherein the encrypted information is stored in a memory associated with the decrypting device.

9. A decrypting device according to claim 1, wherein addresses are regularly shuffled by converting even addresses into next highest odd addresses and odd addresses into next highest even addresses.

10. A decrypting device according to claim 1, wherein addresses are shuffled randomly.

11. A decrypting device comprising:
    a decrypting key retrieval circuit for retrieving a decrypting key from decrypting key information; and
    a decrypting circuit for decrypting encrypted information using the decrypting key,
    wherein the decrypting key information includes information relating to the decrypting key end dummy data which does not relate to the decrypting key.

12. A decrypting device according to claim 11, wherein the encrypted information is an encrypted program.

13. A decrypting device according to claim 11, wherein the encrypted information is encrypted data.

14. A decrypting device according to claim 11, wherein the information relating to the decrypting key includes the decrypting key, and the first conversion circuit includes an extraction circuit for extracting the decrypting key from the decrypting key information.

15. A decrypting device according to claim 11, wherein the decrypting key retrieval circuit includes:

an extraction circuit for extracting the information relating to the decrypting key from the decrypting key information; and a conversion circuit for converting the information relating to the decrypting key into the decrypting key.

16. A decrypting device according to claim 11, wherein the encrypted information is stored in a memory associated with the decrypting device.

17. A decrypting device according to claim 11, wherein addresses are regularly shuffled by converting even addresses into next highest odd addresses and odd addresses into next high even addresses.

18. A decrypting device according to claim 11, wherein addresses are shuffled randomly.

19. A decrypting device comprising:

a decrypting key generation circuit for generating a decrypting key based on first decrypting key information and second decrypting key information; and a decrypting circuit for decrypting encrypted information using the decrypting key, wherein the first decrypting key information is input from outside the decrypting device, the second decrypting key information is stored inside the decrypting device, and the encrypted information is stored in a memory associated with the decrypting device, said decrypting device further comprising an address shuffling circuit for converting an input address in accordance with a predetermined rule and supplying a converted address to the memory, wherein the encrypted information read from the memory in accordance with the converted address is supplied to the decrypting circuit.

20. A decrypting device comprising:

a decrypting key retrieval circuit for retrieving a decrypting key from decrypting key information; and a decrypting circuit for decrypting encrypted information using the decrypting key, wherein the decrypting key information includes information relating to the decrypting key and dummy data which does not relate to the decrypting key, and the encrypted information is stored in a memory associated with the decrypting device, said decrypting device further comprising an address shuffling circuit for converting an input address in accordance with a predetermined rule and supplying a converted address to the memory, wherein the encrypted information read from the memory in accordance with the converted address is supplied to the decrypting circuit.

* * * * *